Oct. 18, 1955  B. SCHENKER ET AL  2,721,310
HIGH VOLTAGE ARTIFICIAL TRANSMISSION LINE
Filed May 18, 1951
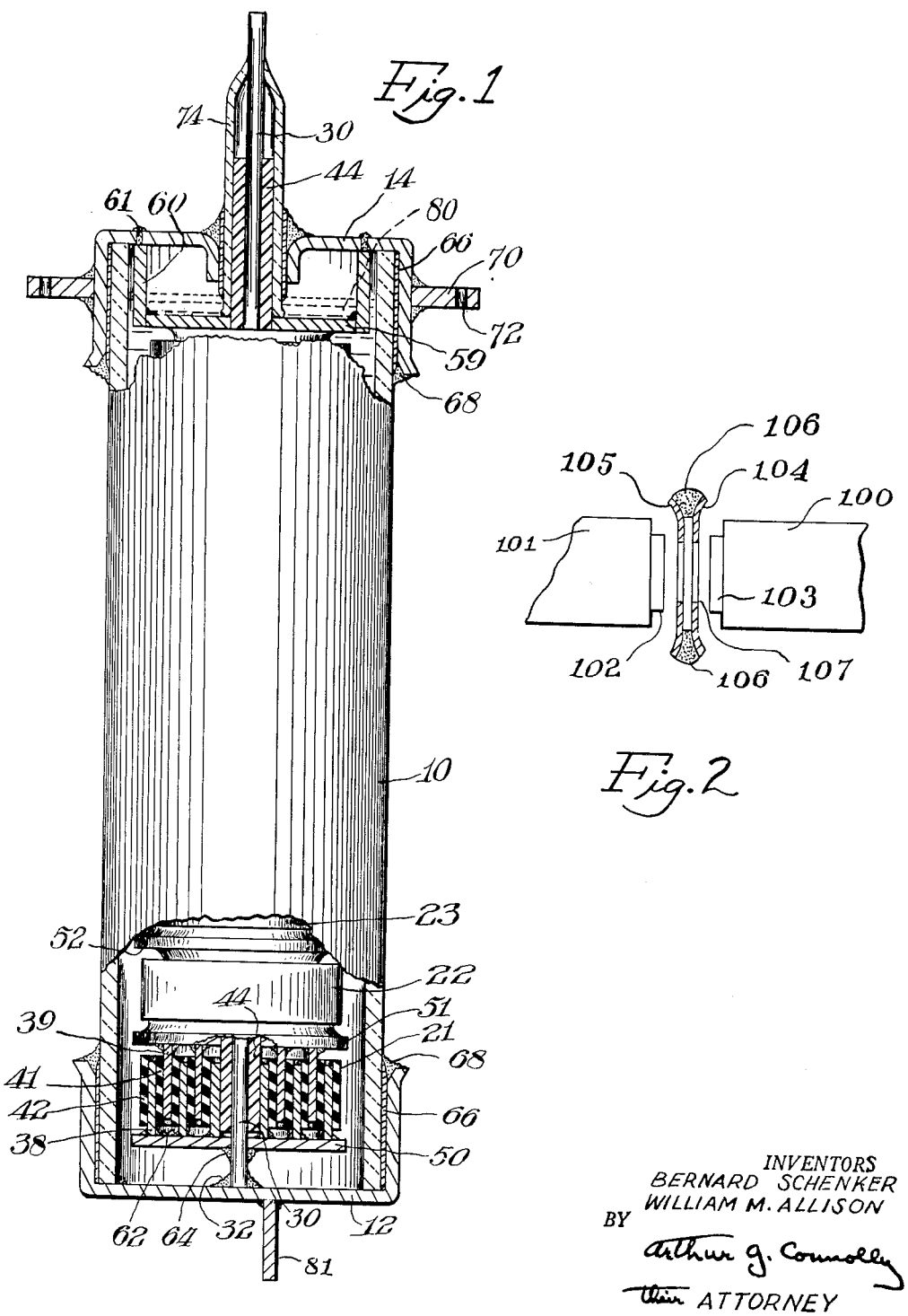
INVENTORS
BERNARD SCHENKER
WILLIAM M. ALLISON
BY
Arthur G. Connolly
ATTORNEY ic Office 2,721,310
Patented Oct. 18, 1955

2,721,310

HIGH VOLTAGE ARTIFICIAL TRANSMISSION LINE

Bernard Schenker, Williamstown, and William M. Allison, North Adams, Mass., assignors to Sprague Electric Company, North Adams, Mass., a corporation of Massachusetts Application May 18, 1951, Serial No. 226,994

10 Claims. (Cl. 333—23)

This invention relates to high frequency, high voltage capacitors more particularly to such units through which electric currents can be transmitted and which will effect a by-passing or shorting out of high frequency components but not the lower frequency components of the transmitted currents.

Several different forms of the above type of units are known, as shown for example in U. S. Patent No. 2,259,234, granted October 14, 1941 and U. S. Patent No. 2,466,766, granted April 12, 1949. These constructions depend for their operation on the provision of a very short by-passing path which presents only a slight impedance to high frequency currents. However the above constructions are not suitable for use at high operating potentials of the order of 4,000 to 10,000 or more volts.

Among the objects of the present invention is the provision of an effective by-passing capacitor of the above type which can be operated at potentials as high as 10,000 volts or higher.

The above as well as additional objects of the present invention will be more completely understood from the following description of several of its exemplifications, reference being made to the accompanying drawing wherein:

Fig. 1 is a side view, partly in section of one such exemplification; and

Fig. 2 is a detail view showing, an alternate technique for assembling the components of the construction of Fig. 1.

According to the present invention, it has been discovered that a very effective form of high frequency by-passing capacitor can be provided by a series-connected chain of extended foil capacitor sections notwithstanding the fact that the chain necessitates the use of a by-pass path of appreciable length. The series connection makes it possible for the chain to withstand an operating potential which is a multiple of the breakdown voltage of the individual sections in the chain.

Referring to the drawing, a tubular container shown as glass cylinder 10 has its ends sealed by metallic caps 12, 14 to form a container or housing for the capacitor. A multiplicity of wound capacitor sections 21, 22, 23, etc., are mounted on a feed-through conductor rod 30 having one end fixed as by solder 32 or welding to cap 12. It is preferred to have between four and eight such sections.

Each section has a pair of metal foils or ribbons 38, 39 usually less than 0.001 inch (1 mil) in thickness convolutely wound with dielectric spacers shown at 41, 42 which spacers may each be in the form of a single or multiple thickness of thin kraft paper or other dielectric material of the kind ordinarily used for capacitor dielectrics. Foil 38 has one side edge projecting from one side of the wound section, while foil 39 has its other side edge projecting from the opposite side of the winding. A sleeve 44 of insulating material such as phenol-formaldehyde resin containing fibrous or powder filler, covers the rod 30 and insulates it from direct contact with the individual wound sections.

Annular discs 50, 51, 52, etc., of electrically conductive material such as metal serve as connection members for the individual sections. Disc 50 has one of its faces circumferentially secured as by solder 62 against the projecting side of foil 38 in section 21, and the disc in turn is electrically connected to feed-through rod 30 as shown at 64. Disc 51 has one face similarly circumferentially linked to the side of foil 39 of section 21, and its other face to the foil 38 of the next section 22, to connect the sections together in series. The succeeding discs 52, etc., interconnect the remaining sections, while the last disc shown at 59 is connected around its entire periphery to cap 14 by means of the continuous band or ring 60. Best results are obtained when the electrical connection to the end-cap is continuous completely around the tube 44 and arrangements other than those shown can be employed for the purpose.

The caps 12, 14 are shown as hermetically sealed to the tubular casing 10 through intermediate metallized bands 66 which can be applied to the tube as disclosed in U. S. Patent No. 2,386,628 granted October 9, 1945. Solder indicated at 68 can be used to seal the caps against the metallized bands. A mounting flange 70 is conveniently fixed as by welding or soldering to the cap 14 and has a sufficient number of bolt openings 72 to insure a good ground return connection to the support against which the flange is mounted.

Feed-through conductor rod 30 extends through an aperture in cap 14. Since the full potential of the feed-through current may be developed between rod 30 and grounded cap 14 (as well as disc 59) high voltage insulation is required. As shown, sleeve 44 is thick enough for this purpose and extends out beyond cap 14. Where the entire assembly is to be hermetically sealed the sleeve can be sealed in air-tight relation to cap 14 and to the rod 30, as by making the sleeve of glass with fused connection seals. Alternatively as shown in the figure, an external sealing tube 74 of glass for example can be fitted over the projecting sleeve 44 and sealed as by metallized bands and solder, or by direct fusion, to the respective members. Inasmuch as high working voltages may cause corona discharge between adjacent exposed portions of spaced conductors, it is advantageous to have the sleeve or sealing tube cover rod 30 to a distance from cap 14 sufficient to prevent corona under operating conditions. At least about two inches is generally satisfactory.

The illustrated embodiment of the invention has its capacitance sections immersed in a dielectric liquid indicated at 80. This liquid can advantageously be the usual type of synthetic oils made by polymerizing or copolymerizing unsaturated hydrocarbons. The copending Robinson application Serial No. 175,437 filed July 22, 1950, now abandoned, the subject matter of which is carried forward in application Serial No. 340,720 filed March 6, 1953, now Patent No. 2,711,498, granted June 21, 1955, shows one such synthetic oil. Where the convolutely wound spacers 41, 42 are of porous material such as paper, they will also be impregnated by the dielectric liquid. However, non-porous spacers such as polyethylene, polystyrene or terephthalic acid-ethylene glycol polymer ribbons can also be used.

To allow for the relative thermal expansion and contraction of the liquid 80, suitable room for expansion is provided. For hermetically sealed units unduly excessive internal pressures may be developed by thermal expansion unless the final sealing is effected at or near the maximum temperature to which the unit may be exposed.

The capacitor of the invention may be assembled by any convenient technique. Thus for example the capacitor sections mounted on sleeve 44 and rod 30 may be secured to cap 12 at joint 32 and, after ring band 60 is fastened to disc 59, may then have tube 10, and cap 14 carrying tube 74 slipped over its opposite end. Tube 10 can then be sealed in cap 12, and band 60 secured to cap 14, as by having openings 61 in cap 14 through which soldering may take place. With the band 60 thus circumferentially connected, the cap 14 can then be sealed in place and the tube 74 then sealed against rod 30.

Where the liquid 80 is to impregnate the wound spacers, the outer end of tube 74 or an opening in cap 14 can be left unsealed and used as a passageway for ingress of the impregnant as well as for a preliminary evacuation to a low internal pressure to improve the penetration of the impregnant into voids in the porous assemblies. For further improving impregnation, solder used for connections to foils 38, 39 can be more or less porous or somewhat incomplete to provide better access to the interior of the section.

If desired, seals of the metal-to-glass kind can be of the strain-resistant form shown in U. S. Patent No. 2,449,759, granted September 21, 1948.

In use cap 12 acts as a by-pass feed-through terminal with stud 81 acting as a terminal connector, cap 14 or flange 70 as a by-pass return or ground terminal, and the rod end projecting from cap 14 as a second feed-through terminal. Currents supplied to either feed-through terminal will be delivered at the other with substantially reduced high frequency components.

A feature of the present invention is the very effective by-passing action by the above unit on high frequency components in spite of the fact that the by-passing path extends over an unusually large distance from rod 30 at joint 64 to flange 70. This distance, which may be as much as 12 inches long or more, and generally more than four inches, has heretofore been considered as presenting an inductance so high as to resonate with the capacitance of any ordinary by-pass unit at frequencies as low as one megacycle or even less. Such resonance would cause the unit to present a very high impedance to signals above the resonant frequency and this high impedance would render by-passing quite ineffective. It has been discovered that the above type of unit having a plurality of cylindrical capacitance sections, offers a very low by-passing impedance to frequencies up to 400 megacycles and higher. This is a significant improvement over any type of high voltage by-pass capacitor known to us, whether the construction be of the impractical single winding type or of individual capacitors connected in series in a conventional manner.

U. S. Patent 2,270,953 discloses an effective by-pass capacitor construction for high frequency applications but does not show any means for adapting the construction to high voltage applications, e. g., 10 kv. and higher.

Another preferred means for interconnection of the individual capacitor sections is shown in Figure 2. In this figure, 101 and 100 represent capacitor sections with extended foils 102 and 103, respectively. The latter are soldered to flanged washers 105 and 104, respectively. The lip on these washers permits rapid and simple subsequent interconnection by means of solder 106. The latter is applied circumferfentially about the periphery of the flanges for optimum high-frequency performance of the finished capacitor. The opening in the center of the washer, as noted at 107, simplifies the initial soldering of the washer to the extended foils of the capacitor winding.

As many apparently different embodiments of this invention may be made without departing from the spirit and scope hereof, it is to be understood that the invention is not limited to the specific embodiments hereof except as defined in the appended claims.

What is claimed is:

1. A high voltage artificial transmission line having a plurality of capacitor sections each being an assembly of conductive foils insulated from each other and convolutely wound around a central elongated feed-through conductor with the side of one foil projecting from one side of the winding and the side of another foil projecting from the other side of the winding, the sections being adjacently mounted along the feed-through conductor and having substantially all portions of their adjacent foil projection connected together by short direct axially-extending connections to provide a series-connected chain of sections with an overall breakdown potential which is a multiple of the breakdown potential for an individual section, the projecting foil at one end of the section assembly being connected to the feed-through conductor to provide a by-passed feed-through terminal of the capacitor, the projecting foil at the other end of the assembly being connected as a by-pass return terminal, and the feed-through conductor at said other end being connected as a second feed-through terminal.

2. The combination as defined by claim 1 in which the chain of sections is surrounded by an enveloping container holding a dielectric impregnant for the insulation of the sections.

3. The combination as defined by claim 2 in which the by-pass return terminal includes a portion of the container immediately adjacent to the connected end of the capacitor section chain.

4. The combination as defined by claim 3 in which the terminal container portion is a flanged end cap for the container, and the feed-through conductor projects through this cap and is insulated from it by a dielectric sleeve surrounding the conductor and projecting at least about two inches beyond the cap.

5. The combination as defined by claim 1 in which the number of capacitor sections is between four and eight.

6. The combination as defined by claim 1 in which each capacitor section is connected to the adjacent section by means of an intervening annular conductor disc with the projecting foil sides soldered to the respective faces of the disc.

7. A high voltage artificial transmission line having a plurality of non-inductively wound series-connected capacitor sections each with electrode edges projecting from each side of the winding, the sections being closely assembled in a row with their adjacent projecting edges facing each other, direct connections electrically connecting the adjacent electrodes over substantially their entire extent, an elongated feed-through conductor extending through the connected sections and connected only to one end of the series-connected chain, the other end of the chain providing a by-pass return terminal.

8. The combination as defined by claim 7 in which the series-connected chain of sections extends more than four inches between its ends.

9. The combination of claim 7 in which the chain of sections is held in a container having an electrically conductive cap with an entirely encircling grounding flange, and the by-pass return terminal is adjacent said cap and directly connected to it.

10. The combination of claim 7 in which the direct connections are established by washers soldered to the respective adjacent electrode edges, the washers having their peripheries flared away from each other and being soldered together.

References Cited in the file of this patent

UNITED STATES PATENTS

| | | |
|---|---|---|
| 2,107,132 | Smith | Feb. 1, 1938 |
| 2,466,766 | Hartzell | Apr. 12, 1949 |
| 2,552,306 | Beverly | May 8, 1951 |
| 2,565,093 | Robinson et al. | Aug. 21, 1951 |